US011555397B2

(12) United States Patent
Samuel (10) Patent No.: US 11,555,397 B2
(45) Date of Patent: Jan. 17, 2023

(54) DETECTING WELLPATH TORTUOSITY VARIABILITY AND CONTROLLING WELLBORE OPERATIONS

(71) Applicant: Landmark Graphics Corporation, Houston, TX (US)

(72) Inventor: Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 190 days.

(21) Appl. No.: 17/120,304

(22) Filed: Dec. 14, 2020

(65) Prior Publication Data

US 2022/0186603 A1 Jun. 16, 2022

(51) Int. Cl.
E21B 47/02 (2006.01)
E21B 47/022 (2012.01)
E21B 47/007 (2012.01)
G01B 21/32 (2006.01)

(52) U.S. Cl.
CPC .......... *E21B 47/022* (2013.01); *E21B 47/007* (2020.05); *G01B 21/32* (2013.01)

(58) Field of Classification Search
CPC ...... E21B 47/007; E21B 47/022; G01B 21/32
See application file for complete search history.

(56) References Cited

U.S. PATENT DOCUMENTS

| | | | |
|---|---|---|---|
| 6,026,912 A | 2/2000 | King et al. | |
| 7,142,986 B2 | 11/2006 | Moran | |
| 9,202,169 B2 | 12/2015 | Al-Yami et al. | |
| 9,659,113 B2* | 5/2017 | Wicks | G06F 30/20 |
| 9,938,815 B2* | 4/2018 | Samuel | E21B 47/022 |
| 10,233,750 B2* | 3/2019 | Samuel | E21B 44/00 |
| 10,450,854 B2* | 10/2019 | Marland | E21B 47/007 |
| 10,883,360 B2* | 1/2021 | Samuel | E21B 47/022 |
| 11,365,621 B2* | 6/2022 | Samuel | E21B 41/00 |
| 2015/0226052 A1 | 8/2015 | Samuel et al. | |
| 2015/0240622 A1* | 8/2015 | Bang | E21B 47/00 702/11 |
| 2015/0369042 A1 | 12/2015 | Samuel et al. | |

(Continued)

FOREIGN PATENT DOCUMENTS

| | | | |
|---|---|---|---|
| WO | 2004090285 A1 | 10/2004 | |
| WO | 2015126642 A1 | 8/2015 | |

(Continued)

OTHER PUBLICATIONS

Samuel et al. "Mechanical and Geometrical Tortuosities: Vanishing and Appearing Tortuosities," SPE-206188-MS (Year: 2021).*

(Continued)

*Primary Examiner* — John Fitzgerald
(74) *Attorney, Agent, or Firm* — Delizio, Peacock, Lewin & Guerra (57) ABSTRACT

Methods and systems for determining wellpath tortuosity are disclosed. In accordance with an embodiment, a tortuosity of a borehole segment is determined and a tortuosity of a casing associated with the borehole segment is determined based, at least in part, on the tortuosity of the borehole segment and a path conformity characteristic of the casing. A tortuosity variation factor is generated based on a value of the tortuosity of the casing relative to a value of the tortuosity of the borehole segment.

24 Claims, 6 Drawing Sheets

(56) References Cited

U.S. PATENT DOCUMENTS

2017/0306748 A1 10/2017 Marland et al.
2018/0003031 A1* 1/2018 Samuel .................. E21B 47/007
2018/0128095 A1* 5/2018 Zhang ................... E21B 47/024

FOREIGN PATENT DOCUMENTS

| WO | 2019118055 A1 | 6/2019 |
| WO | 2019147297 A1 | 8/2019 |
| WO | 2020246978 A1 | 12/2020 |

OTHER PUBLICATIONS

Samuel et al. "Tortuosity: The Rest of the Hidden Story," SPE-194167-MS (Year: 2019).*
Bang et al. "Wellbore Tortuosity Analysed by a Novel Method May Help Improve Drilling, Completion, and Production Operations," SPE/IADC-173103-MS (Year: 2015).*
Rezmer-Cooper et al. "Field Data Supports the Use of Stiffness and Tortuosity in Solving Complex Well Design Problems," SPE/IADC-52819 (Year: 1999).*
PCT Application No. PCT/US2020/065172, International Search Report, dated Aug. 27, 2021, 4 pages.
PCT Application No. PCT/US2020/065172, Written Opinion, dated Aug. 27, 2021, 3 pages.

* cited by examiner

DETECTING WELLPATH TORTUOSITY VARIABILITY AND CONTROLLING WELLBORE OPERATIONS

TECHNICAL FIELD

The disclosure generally relates to the field of well operations and to determining wellpath tortuosity, detecting changes in wellpath tortuosity, and controlling wellbore operations based thereon.

BACKGROUND

Extended reach drilling encompasses directionally drilling to reservoir targets located at some lateral distance from the drilling rig. Extended reach drilling has become increasingly prevalent and adds significant complexity to directional drilling due to the multivariate set of challenges regarding drilling efficiency including drill string torque and drag, vibration, hole cleaning, casing installation and others. The foregoing challenges result from a friction factor caused by changing wellbore trajectory and sub-optimal wellbore smoothness. Tortuosity is a term sometimes used to characterize the extent and nature of changes in direction of wellbores as well as a lack of wellbore smoothness that results in a level of friction affecting wellbore operation. Tortuosity may be classified in terms of scale such as micro tortuosity, meso tortuosity, and macro tortuosity classifications. Tortuosity may also be spatially/dimensionally classified such as two-dimensional undulation or three-dimensional spiraling classifications.

Tortuosity is a significant factor in complex directional well trajectories, complex build rates, and precision steering in narrow reservoirs and extended reach wells. Tortuosity may be determined for a borehole and/or for a casing installed within and along a borehole. A survey may be performed to directly measure, such as by magnetic tool or gyroscope measurement, tortuosity of a segment of open borehole (i.e., a segment of a wellbore comprising an uncased borehole). The measured tortuosity data may be utilized, for example, to select or otherwise determine optimal casing equipment and installation procedure for casing the uncased borehole segment. Accurate determination of tortuosity during and following drilling cycles may be a significant factor in optimizing drill path planning and directional drilling steering as well as in casing string completion operations.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Disclosed embodiments are directed to methods and systems for calculating or otherwise determining tortuosity values and variations in wellpath tortuosity for various points along a wellpath and controlling well operation based, at least in part, on the tortuosity data. In some embodiments, a tortuosity may be determined based on a relationship between tortuosity of a segment of uncased wellbore (geometric tortuosity) and tortuosity of a corresponding portion of wellbore casing corresponding to the borehole segment (mechanical tortuosity). In some embodiments, wellpath data is input into a model that calculates or otherwise determines one or more tortuosity values for a planned wellpath based, at least in part, on the relationship between geometric tortuosity of portions of uncased borehole and mechanical tortuosity of corresponding segments of wellbore casing. Well operation control including adjustments to a drilling plan or to other drilling parameters may be determined, adjusted, and implemented in response to the calculated tortuosity values being above or below predetermined tortuosity threshold values. In some embodiments drill steering or other types of operations may be adjusted based, at least in part, on tortuosity measurements and estimations. For example, a drilling direction may be altered in response to determining that a tortuosity variation factor has exceeded a specified threshold value.

Example Illustrations

Figure 1:
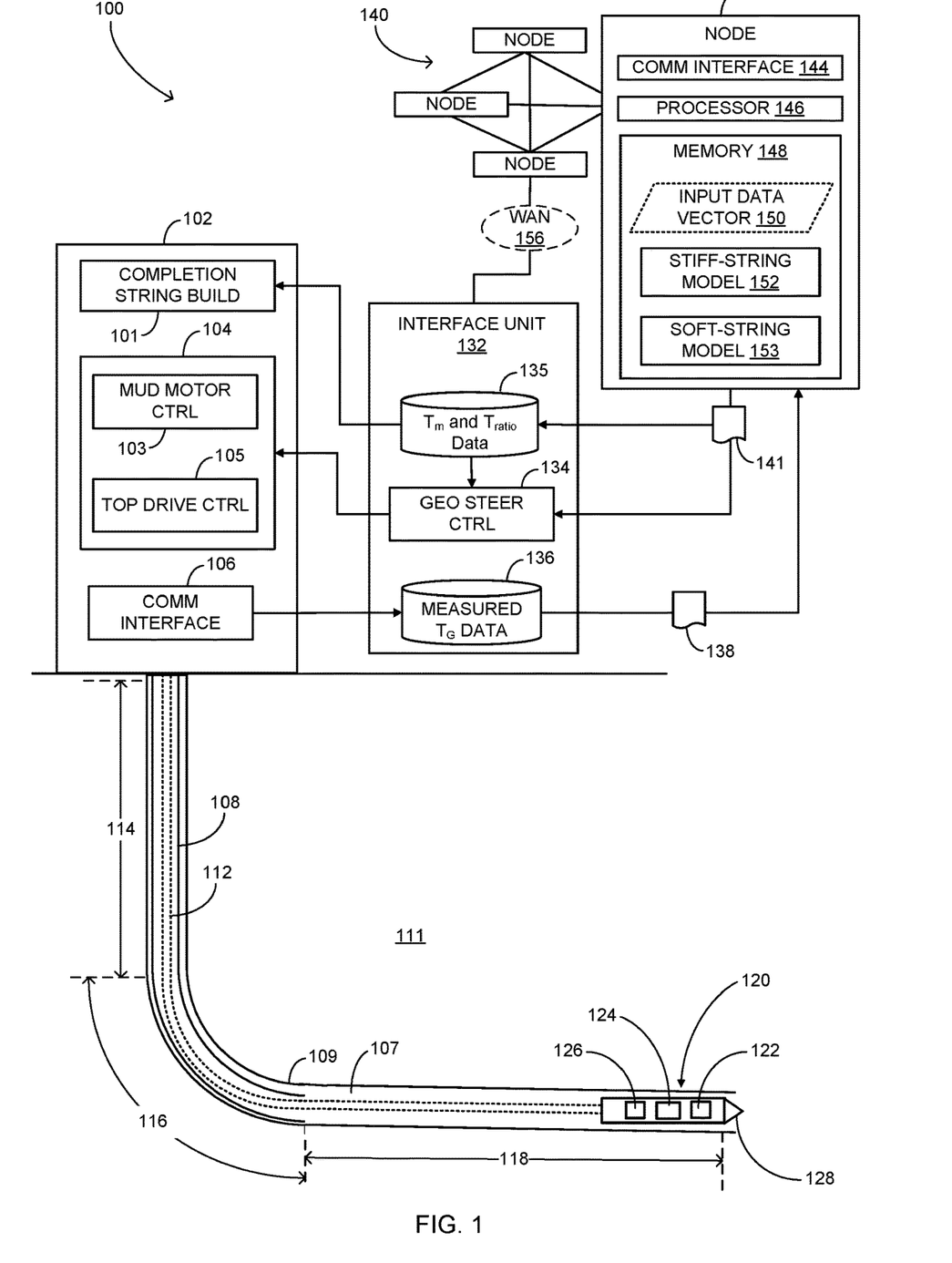
FIG. 1 depicts a drilling system configured in accordance with some embodiments.

FIG. 1 is a block diagram depicting a drilling system 100 that includes components for determining wellpath tortuosity in accordance with some embodiments. Drilling system 100 includes a wellhead 102 comprising components for drilling and data logging within a formation 111, which may be a petroleum reservoir. Wellhead 102 comprises mechanical, electrical, and electronic systems, subsystems, devices, and components for drilling a borehole 107 defined by a borehole wall 109. Wellhead 102 further includes components for interacting with downhole instruments to perform downhole survey logging during drilling or following or between drilling intervals using a wireline configuration. The components within wellhead 102 include drilling and test equipment including top drive and steering equipment 104 and a communication interface 106. Top drive and steering equipment 104 include systems and components configured to provide torque to a drill string 112 to drill borehole 107 and also components to modify drilling direction. For instance, top drive and steering equipment 104 include a top drive controller 105 and a mud motor controller 103 configured to control operations of surface top drive equipment and downhole mud motor steering equipment. In this manner, top drive controller 105 and mud motor controller 103 form a control interface for generating and transmitting steering control signals to steering components on the drill string 112 such as rotary steerable system components.

Communication interface 106 is configured to provide signal communication with locally networked components such as downhole measurement tools and a local processing interface unit 132. Communication interface 106 may include components configured to enable multi-lateral signal transmission between processing nodes within a data processing system 140, a downhole measurement tool 124, and other local components. During measurement logging operations, measurement tool 124 is disposed (e.g., via wireline or logging while drilling (LWD)) at various locations within borehole 107 while communicatively coupled to communication interface 106 via a telemetry link (not expressly depicted). The telemetry link may comprise components and connectivity media for establishing acoustic, optical, electronic, and/or electromagnetic communications links between measurement tool 124, interface unit 132, and data processing system 140.

When deployed in a LWD or measuring while drilling (MWD) configuration as shown in FIG. 1, measurement tool 124 may be deployed within a bottom hole assembly (BHA) 120 attached at the distal end of a drill string 112 that includes a drill bit 128 and a steering tool 122 for steering the bit. In some embodiments, steering tool 122 may comprise a mud motor controlled by mud motor controller 103. As shown, drill string 112 is disposed within and along the length of a casing string 108 within borehole 107 and extends through to an uncased end portion of borehole 107. Casing string 108 may comprise one or more of a variety of sections of casing used to seal boreholes including surface casing, intermediate casing, production casing, production line, and/or other types of movable tubing that is fixedly installed within borehole 107. An overall wellpath is formed by the combination of cased and uncased portions of borehole 107.

Wellhead 102 includes components for deploying sections of casing material, such as casing tubulars, downhole to be installed at various positions along borehole 107. Wellhead 102 also includes components for configuring and controlling deployment in terms of insertion and withdrawal within borehole 107 of drill string 112 that incorporates measurement tool 124. For wireline embodiments, measurement tool 124 may be deployed within or in the absence of casing string 108 and may include a wireline cable for moving and providing communication and power source connectivity for downhole test tools.

In the depicted embodiment, measurement tool 124 comprises a survey logging tool configured to measure positions, angular directions, and lengths of segments of borehole 107 formed by the penetration within formation 111 of drill bit 128. Measurement tool 124 may include components for directly measuring, detecting, or otherwise determining borehole trajectory metrics such as borehole inclination angle, azimuthal angle, and distance between survey points. For instance, measurement tool 124 may comprise a directional survey tool in the form of a gyroscopic survey tool configured to detect/measure non-magnetic deviations in downhole environments such as within the open portion (i.e., uncased portion) of borehole 107. Measurement tool 124 may also or alternatively comprise a directional survey tool in the form of a geomagnetic survey tool configured to detect/measure magnetic deviations in downhole environments such as within the open portion of borehole 107.

The signals measured by the gyroscopic and/or magnetic sensors may be translated by processing components with measurement tool 124 into dimensionally specified angles such as inclination and azimuth angles and distances. To this end, downhole measurement tool 124 further includes an electronics assembly comprising, in part, a digital signal processor configured to process and convert raw measurement signals from the sensors into measured survey data in the form of inclination, azimuth, and distance. The angular and distance measurements may be performed incrementally at set points or continuously as BHA 120 travels along borehole 107. The measured survey data provides macro path information that includes tortuosity in the form of planned bending and borehole torsion that enables the system to maintain a planned path. The measured survey data further provides mezzo and micro directional information that includes unplanned or otherwise incidental tortuosity in the form of path deviations in the form of bending and torsion of the borehole between setpoints. Therefore, the measured tortuosity may include planned three-dimensional directional changes that conform to the planned well and may further includes information quantifying a lack of smoothness of the borehole path.

The survey data may be recorded by a log unit within measurement tool 124 such as in defined data object structures that are transmitted by a communication interface 126 within BHA 120 to a surface communication interface 106. From communication interface 106, the survey measurement data is routed to and recorded in a survey measurement storage 136 within interface unit 132. The survey measurement data may also or alternatively be provided directly as streamed data or otherwise real-time formatted data to a processing node within data processing system 140. The survey measurement data is processed by components within data processing system 140, interface unit, 132, and wellhead 102 to track the shape and trajectory of borehole 107.

The survey measurements may be utilized, for example, to maintain a planned wellpath that traverses various downhole locations corresponding to setpoints that define the wellpath. Macro tortuosity is a factor incorporated within a planned wellpath for directional drilling (e.g., extended reach drilling) that includes changing directions in two or three dimensions resulting in a curved wellpath. Such macro tortuosity is sometimes referred to as dogleg or dogleg severity. Micro and mezzo tortuosity are also factors that are incidental to imperfect tracking of planned wellpaths due to variations in downhole strata conditions, drill bit variations, variability in downhole steering operations, etc. These and other tortuosities measured for the uncased borehole may be quantified as values assigned over one or more borehole segments and may be designated as geometric tortuosity, $T_g$.

$T_g$ for one or more segments of borehole 107 is in effect measured in terms of the angular and distance measurements performed by measurement tool 124 and stored in survey measurement storage 136. Precise values for $T_g$ may be calculated or otherwise computed using various formulas. For example, $T_g$ as a macro value characterizing largely planned borehole curvature may be determined in accordance with formulas such as the follow relation:

$$T_g = |\theta_m - \theta_{m-1}|/D \times 100$$

wherein geometric tortuosity characterizing dogleg severity, $T_g$, is the calculated actual tortuosity of the uncased borehole based on measured angular and positional data; $\theta$ is the measured angle (e.g., inclination or azimuthal); and D is the distance between two survey points that are the endpoints of the borehole segment for which $T_g$ is determined. The $T_g$ value is in degrees per one hundred distance measurement metrics (e.g., feet). Additionally or alternately, $T_g$ may characterize the deviation from the planned well path and be determined in accordance with the following relation:

$$T_g = \Sigma T_g(\text{drilled}) - \Sigma T_g(\text{planned})/D$$

wherein $T_g$ is the geometric tortuosity over one or more borehole segments, $T_g$(drilled) is the measured geometric tortuosity over the one or more segments, and $T_g$(planned) is the planned tortuosity. Another formula for determining $T_g$, incorporates dogleg severity at each given point. For instance, $T_g$ may be determined by the relation:

$$T_g = \Sigma_{i=1}^{m} \alpha_{n-1} + \Delta D \times DLS_i / d_i - d_{i-1}$$

wherein $\alpha$ is inclination angle, $\Delta D$ is the distance between survey points, DLS is dogleg severity, and d is depth. In addition to calculated discrete values, tortuosity along significant lengths of borehole 107 may be computed by various modeling techniques such as curve trajectory models. For example, processing system may execute a minimum curvature model using discrete survey point data to more accurately estimate the curvature of the path between points.

The geometric tortuosity values may be computed such as by node 142 within data processing system 140 using the measured tortuosity data such as may be retrieved in measured tortuosity data 138 from survey measurement storage 136. The geometric tortuosity values may be used to facilitate downhole operations such as drilling and steering in which torque and drag calculations may use the data to conduct and adjust drill string positioning operations by computing a wellpath friction factor. The geometric tortuosity values may also be used for steering such as by adjusting the instructions to top drive and steering equipment 104.

The geometric tortuosity (i.e., tortuosity measured within the open, uncased borehole) may not accurately represent the net tortuosity of the overall wellpath that includes cased as well as uncased portions. The wellpath depicted in FIG. 1 includes a cased upper section and an uncased lower section of borehole 107 that overlap segments defining a vertical span 114, a bend section 116, and a lateral span 118. Once casing is installed such as within vertical span 114 and most of bend section 116, the geometric tortuosity values lose some precision in terms of characterizing the overall wellpath tortuosity due to some tendencies of the casing to cause directional discontinuities to be reduced or eliminated and in some cased increased. After portions of casing string 108 are installed within borehole 107, the flexural stiffness and material rigidity of the casing tubulars and the compression and tension loads along and between the tubulars results in a somewhat different curvature profile that may result in some reduction in net tortuosity at some locations and some increases at other locations.

The systems, components, operations, and functions described herein implement a method to estimate, predict, or otherwise determine the tortuosity of portions of cased and/or to-be-cased borehole segments, which may be referred to as mechanical tortuosity. The method further includes operations for detecting and quantifying the relative tortuosity between the borehole and casing that may or may not already be installed. The relative tortuosity may be referred to herein as a tortuosity variation factor. By more accurately determining mechanical tortuosity and providing a trend indication of whether net tortuosity is increasing or decreasing, wellbore control systems and components within wellhead 102 may optimize operations such as drill steering and case completion operations.

The systems, components, operations, and functions described herein implement a method by which mechanical tortuosity modeling mechanisms are utilized to accurately and efficiently process casing properties data and measured tortuosity data generated by downhole measurement tools. Data processing system 140 in combination with interface unit 132, wellhead 102, and downhole equipment may utilize the resulting mechanical tortuosity data and relative tortuosity data for controlling or modifying control of drilling and other operations.

Regarding downhole operations control, interface unit 132 and/or wellhead 102 include a geo steering controller 134 that generates and transmits control signals to top drive and steering equipment 104. Geo steering controller 134 generates the control signals based on mechanical tortuosity data and tortuosity variation information from node 142 that may be input and stored within a tortuosity data storage 135. The control signals may be generated by geo steering controller 134 based on the values and trends in the tortuosity data received directed from node 142 and/or from tortuosity data storage 135. The control signals may be transmitted to top drive and steering equipment 104 from storage 135 and/or in direct, real-time sequential association with a sequence of mechanical and relative tortuosity data 141 generated by node 142. Geo steering controller 134 may utilize the tortuosity data 141 as a supplement to or otherwise in conjunction with other input or pre-programmed information to generate and transmit control setting signals for setting and modifying drilling and steering operations. Interface unit 132 may further provide access to the mechanical tortuosity data and tortuosity variation information (e.g., ratio of casing tortuosity to borehole tortuosity) within tortuosity data storage 135 to a completion string build system 101 within wellhead 102.

Tortuosity data 141 may include multiple records that each associate a borehole depth (e.g., distance within borehole and/or true vertical depth (TVD)) with corresponding mechanical tortuosities and relative tortuosity metrics computed by node 142. Geo steering controller 134 generates control settings in response to or otherwise based on the tortuosity information generated by and received from data processing system 140 via a local connection or via a wide area network 156. Interface unit 132 is configured to transmit data and instructions to wellhead 102 and may further include components such as electronic transmission and/or fluid pressure signal generating components for remotely communicating the control settings. In some embodiments, interface unit 132 transmits control setting signals to downhole devices via communication interface 106. Alternatively, interface unit 132 and downhole drilling and steering equipment may include wireless communication interfaces enabling communication with downhole and surface devices using, for example, acoustic telemetry via the metal piping of or fluid within casing string 108.

Data processing system 140 comprises a multi-processor system including multiple interconnected processing nodes that may collectively form a parallel processing system that implements one or more types of modeling such as a neural network in which each node is a respective node of the neural network. Data processing system 140 comprises any combination of hardware, firmware, and software program logic configured to implement one or more tortuosity modeling schemas such as stiff-string modeling performed by a stiff-string model 152 and soft-string modeling performed by a soft-string model 153. Stiff-string models and soft-string models utilize complex algorithms that estimate the accurate contact point locations and side forces and utilizing various wellbore related input parameters describing the borehole and typically a drillstring. Aspects of stiff-string and soft-string models are described by Fazaelizadeh, M. "Real Time Torque and Drag Analysis during Directional Drilling," University of Calgary, (2013). Additional aspects of stiff-string and soft-string models are described by Mirhaj, S. & Kaarstad, Eirik & Aadnoy, B. (2016), "Torque and Drag Modeling; Soft-string versus Stiff-string Models" 10.2118/178197-MS. As disclosed herein, stiff-string and soft-string models may be utilized to determine path conformity between a borehole and a casing corresponding to the borehole.

The stiff-string model 152 and soft-string model 153 may serve complementary roles in determining curvature/contour conformity between a borehole and casing or prospective casing. For example, a soft-string model such as soft-string model 153 is configured to characterize the casing as lying against the lower side of the borehole and therefore not accounting for the stiffness of the casing. In some modeling applications, the casing may be represented by a cable divided into small subsections that only carry axial load with the contact forces on the casing supported by the borehole. A stiff-string model such as stiff-string model 152 may be configured to model the downhole context more comprehensively to model, for example, the stiffness and bending moment of tubulars and radial clearance at various points between the casing and surface of the borehole.

Interface unit 132 generates measured tortuosity data 138 from measurement data recorded in survey measurement storage 136. Interface unit 132 transmits measured tortuosity data 138 to one or more of the computation nodes, such as a node 142, within data processing system 140. Node 142 comprises processing and memory components as well as other hardware and software components for receiving, storing, processing, and transmitting information to and from interface unit 132. Interface unit 132 may generate measured tortuosity data 138 based on various combinations of measurement data within survey measurement storage 136 such as by correlating measurement depths and/or timestamp values between recorded measurements to provide a time sequence of temporally and spatially corresponding measurement data. The measurement data sequence can be processed by data processing system 140 to determine mechanical tortuosities and relative tortuosities that are recorded as mechanical and relative tortuosity data 141.

Node 142 includes a communication interface 144 that comprises any combination of hardware and software, such as network adapter components, configured to enable communication with the other nodes within data processing system 140 and interface unit 132. Node 142 further includes a processor 146 and a memory 148 for storing, executing, and otherwise processing program code and input data including stiff-string mode 152, soft-string model 153, and an input data vector 150. Stiff-string model 152 and soft-string model 153 may comprise a runtime-selectable plugin program or routine including program instructions configured to process path conformity characteristics of one or more segments of casing 108 contained within the content of input data vector 150. The path conformity characteristics may comprise flexure properties of casing tubulars such as bending stiffness, torsion stiffness, elastic deformation properties, plastic deformation properties, and tubular weight.

In addition to the casing path conformity characteristic data, input data vector 150 may include geometric tortuosity data 138. Input data vector 150 is a multivariate vector data construct that includes specified parameters that in combination indicate a multivariate pattern that may be modeled by stiff-string model 152 and/or soft-string model 153. A series of test data vectors such as input data vector 150 may be included within an input data set and received and processed by stiff-string model 152 and/or soft-string model to generate mechanical tortuosity data. A current operational configuration (e.g., drilling, casing installation) can be modified based on the generated mechanical tortuosity data in combination with the relative tortuosity data that serves as a tortuosity variation factor. In this manner, operational adjustments may be implemented based on estimated/predicated changes in wellpath tortuosity, which are identified based on the combined mechanical tortuosity and relative tortuosity data. During autonomous operation, for example, drill steering instructions executed by top drive and steering equipment 104 may be adjusted or otherwise selected based on mechanical tortuosity measurements and quantified values for the relative tortuosity between the open borehole and casing. For example, the values of one or more tortuosity variation factors (e.g., Tm values, $T_m/T_g$ ratio) may computed and/or tracked by control systems such as any combination of geo steering controller 134, mud motor controller 103, and top drive controller 105. The tortuosity value(s) may be compared to corresponding high or low threshold values by the controller(s), which may select an operation or operational adjustment based on the comparison. For example, controller(s) within top driving and steering equipment 104 may adjust or select a steering instruction in response to determining that $T_m/T_g$ exceeds a specified threshold.

Figure 2:
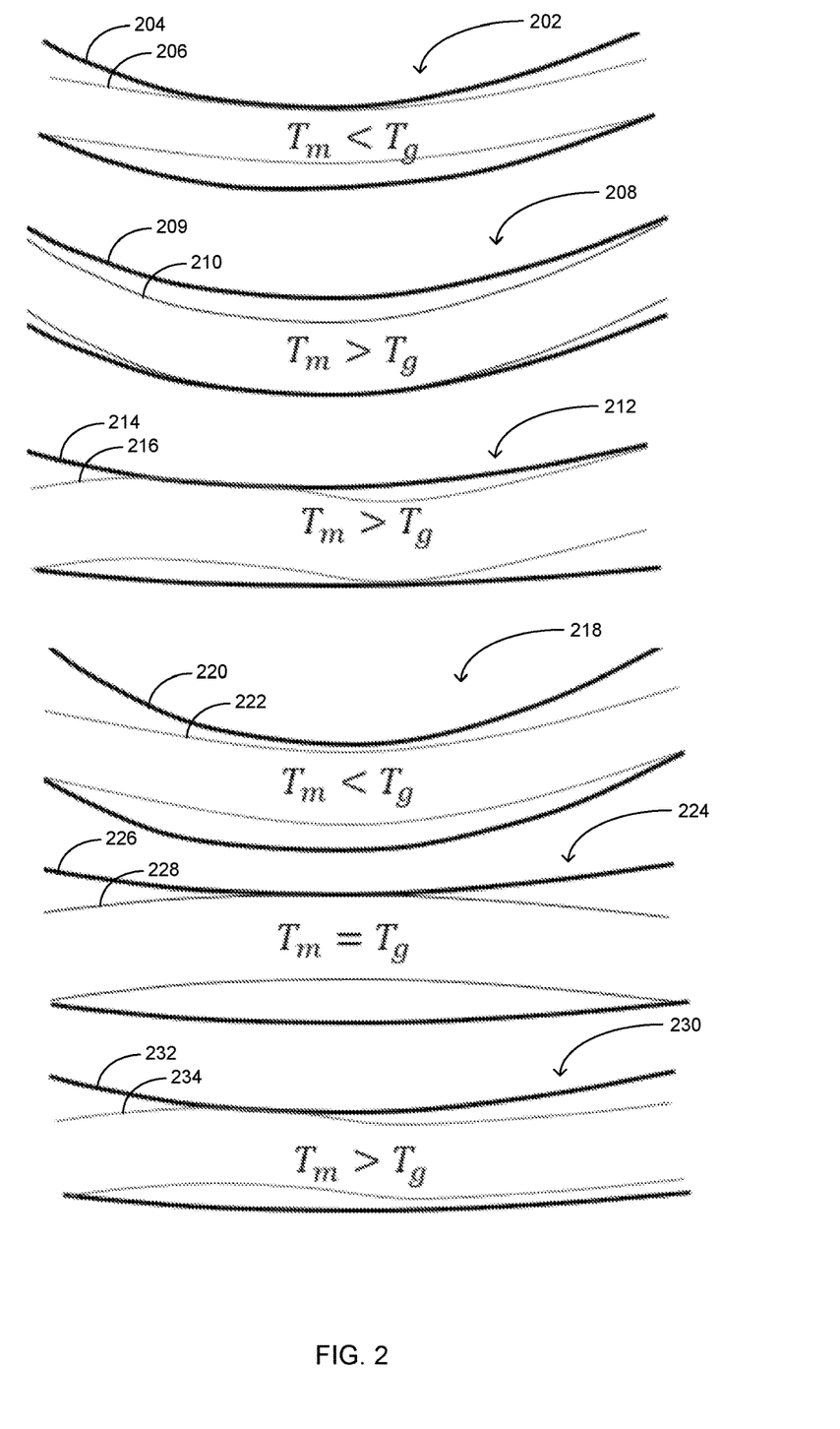
FIG. 2 depicts relative curvature profiles that include casing curvatures overlaying borehole curvatures illustrating single span tortuosities in accordance with some embodiments.

FIG. 2 depicts relative curvature profiles that include casing curvatures overlaying borehole curvatures that illustrate single span tortuosities as may be modeled by stiff-string model 152 and soft-string model 153. A set of six distinct wellpath curvature profiles 202, 208, 212, 218, 224, and 230 include representation of a single span casing curvature relative to single span borehole curvatures such as may be generated by stiff-string model 152. Curvature profile 202 includes a segment of casing 206 determined by stiff-string model 152 to have a shallower bend than corresponding borehole segment 204. Consequently, stiff-string model 152 and/or other processing units determine that the mechanical tortuosity, $T_m$, of casing 206 is lower than the geometric tortuosity, $T_g$, of borehole segment 204. Curvature profile 208 includes a segment of casing 210 determined by stiff-string model 152 to have a sharper bend than corresponding borehole segment 209. In response, stiff-string model 152 and/or other processing units determine that the $T_m$ of casing 210 is higher than the $T_g$ of borehole segment 209. Curvature profile 212 includes a segment of casing 216 determined by stiff-string model 152 to have a greater number of direction changes (bends) than corresponding borehole segment 214. In response, stiff-string model 152 and/or other processing units determine that the $T_m$ of casing 216 is higher than the $T_g$ of borehole segment 214. Curvature profile 218 includes a segment of casing 222 determined by stiff-string model 152 to have a shallower bend than corresponding borehole segment 220. In response, stiff-string model 152 and/or other processing units determine that the $T_m$ of casing 222 is higher than the $T_g$ of borehole segment 220. Curvature profile 224 includes a segment of casing 228 determined by stiff-string model 152 to have an opposing but substantially similarly sharp bend as corresponding borehole segment 226. In response, stiff-string model 152 and/or other processing units determine that the $T_m$ of casing 228 is equal to the $T_g$ of borehole segment 226. Curvature profile 230 includes a segment of casing 234 determined by stiff-string model 152 to have a greater number of direction changes (bends) than corresponding borehole segment 232. In response, stiff-string model 152 and/or other processing units determine that the $T_m$ of casing 234 is higher than the $T_g$ of borehole segment 232.

In addition to computing the mechanical tortuosities of the segments of casing based on the curvature of the corresponding borehole segments and flexure properties of the casing, the modeling tools or other processing units within node 142 perform a comparison between the $T_m$ value and $T_g$ value to determine relative tortuosity. In some embodiments, the node 142 generates a tortuosity variation factor as a specific tortuosity variation value in the form of a ratio of each $T_m$ value to each corresponding $T_g$ value. In this manner, each of curvature profiles 208, 212, and 230 have a $T_m/T_g$ ratio that is greater than one indicating an increasing level of tortuosity that appears due to the mechanical and physical material properties of the casing tubulars.

Figure 3A:
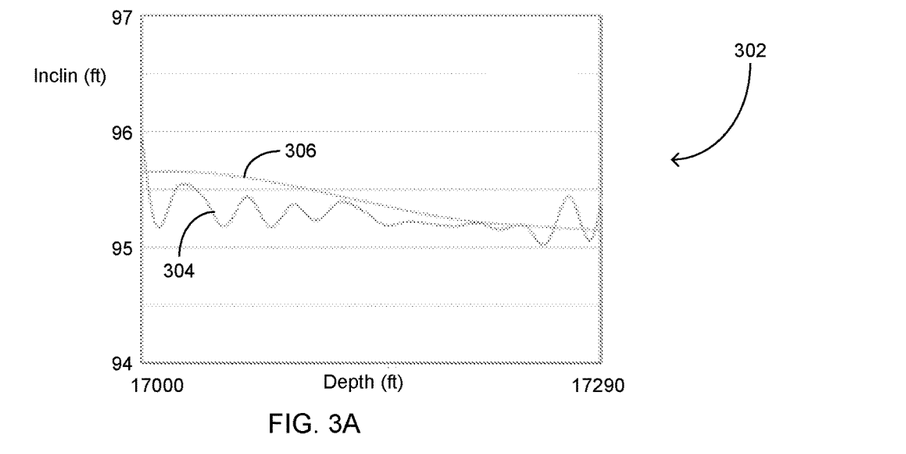
FIG. 3A is a graph illustrating computed mechanical tortuosity of casing within a borehole superimposed with respect to measured geometric tortuosity for a corresponding borehole segment in accordance with some embodiments.
Figure 3B:
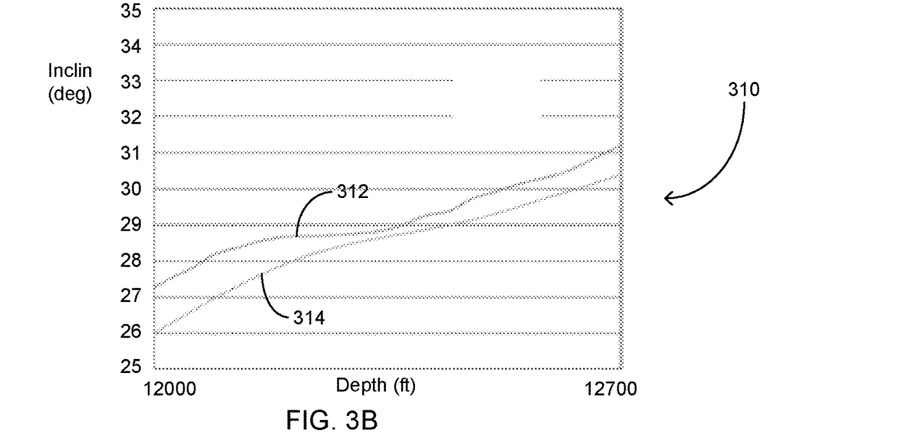
FIG. 3B is a graph depicting computed mechanical tortuosity of casing within a borehole superimposed with respect to measured geometric tortuosity for a corresponding borehole segment in accordance with some embodiments.
Figure 3C:
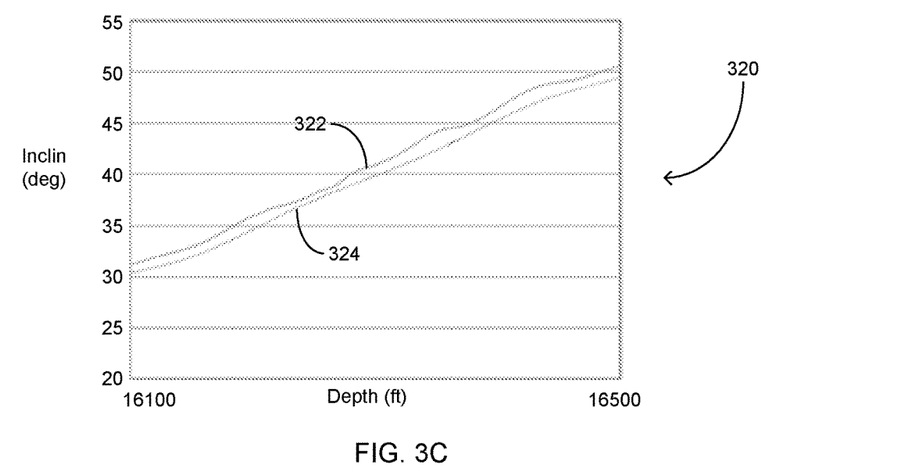
FIG. 3C is a graph illustrating measured mechanical tortuosity of casing within a borehole superimposed with respect to measured geometric tortuosity for a corresponding borehole segment in accordance with some embodiments.

FIGS. 3A, 3B, and 3C depict measurements of relative tortuosity as may be determined by the modeling tools within node 142 such as stiff-string model 152. FIG. 3A is a graph illustrating computed mechanical tortuosity of casing within a borehole superimposed with respect to measured geometric tortuosity for a corresponding borehole segment. The depicted tortuosity data 302 includes a curve 304 showing substantial geometric tortuosity of a borehole segment that is measured and collected by MWD instruments such as measurement tool 124. Tortuosity data 302 further includes a curve 306 showing substantially lower mechanical tortuosity of a casing segment corresponding to the borehole segment. FIG. 3B is a graph depicting computed mechanical tortuosity of casing within a borehole superimposed with respect to measured geometric tortuosity for a corresponding borehole segment. The depicted tortuosity data 310 includes a curve 312 showing moderate geometric tortuosity of a borehole segment that is measured and collected by MWD instruments such as measurement tool 124. Tortuosity data 310 further includes a curve 314 showing relatively similar mechanical tortuosity of a casing segment corresponding to the borehole segment. FIG. 3C is a graph depicting computed mechanical tortuosity of casing within a borehole superimposed with respect to measured geometric tortuosity for a corresponding borehole segment. The depicted tortuosity data 320 includes a curve 322 showing moderate geometric tortuosity of a borehole segment that is measured and collected by a gyro survey instrument such as measurement tool 124. Tortuosity data 320 further includes a curve 324 showing relatively similar mechanical tortuosity of a casing segment corresponding to the borehole segment.

Figure 4A:
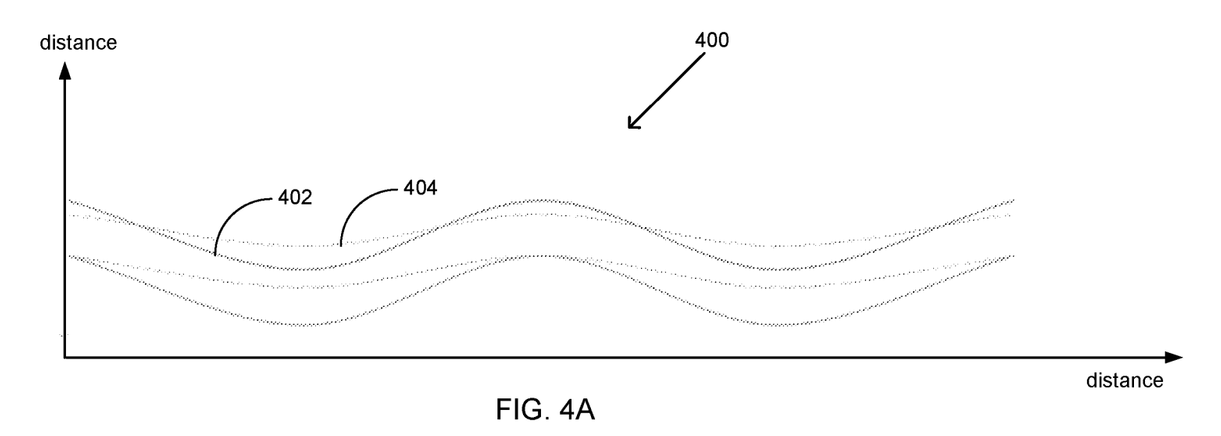
FIG. 4A is a graph depicting a self-weight curvature profile including representation of a two-span casing segment shape superimposed over a corresponding borehole segment.
Figure 4B:
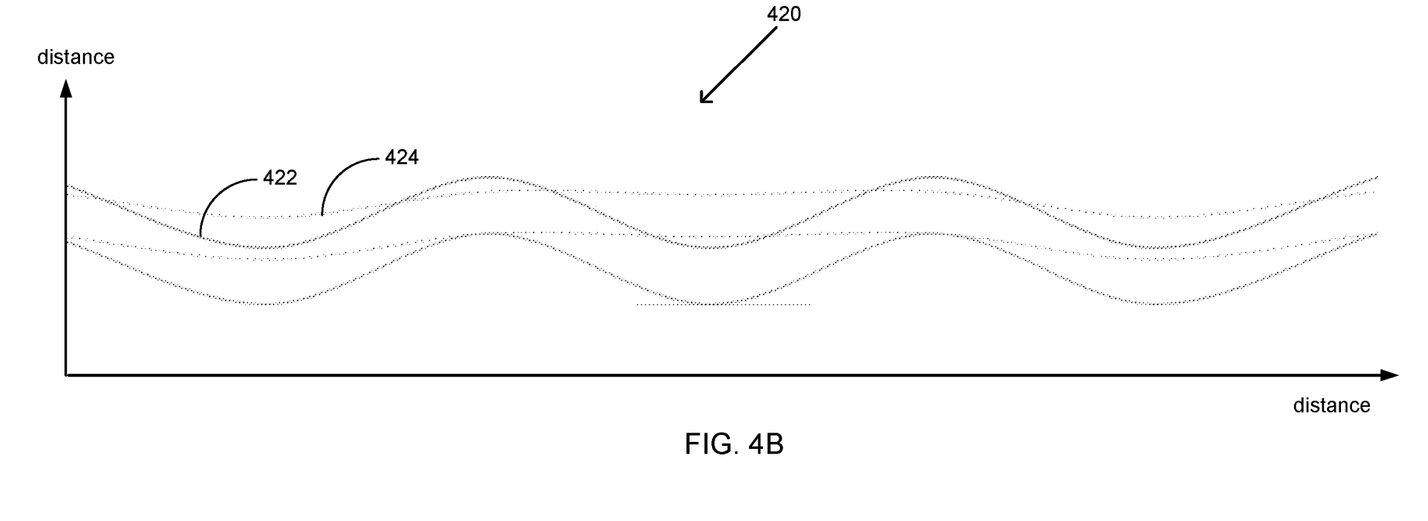
FIG. 4B is a graph illustrating a self-weight curvature profile including representation of a three-span casing segment shape superimposed over a corresponding borehole segment.

In addition to single span modeling and mechanical tortuosity calculation, other types of modeling may be implemented by node 142 to calculate or otherwise determine $T_m$ for casing segments that extend into multiple spans and may require more complex modeling. For example, FIGS. 4A and 4B are graphs depicting a self-weight curvature profiles including representations of a two-span and a three-span casing segment shape superimposed over a corresponding borehole segment. As shown in FIGS. 4A and 4B, the measured $T_g$ data for a borehole segment is represented by curves 402 and 422, respectively. As with the stiff-string model, a modeling tool within node 142 calculates $T_m$ data represented as curves 404 and 424 based on $T_g$ or other curvature metric for the borehole segment and also on properties of the casing segment such as flexure and casing tubular weight. For instance, the model 152 may be configured to implement continue-beam modeling in which the criteria for quantifying a wellpath is based on energy translation and balancing rather than the geometric methods used in stiff-string modeling. In this embodiment, the casing is represented by the model as a thin elastic beam known as the minimum energy curve and is characterized in terms of tortuosity by bending least which passing through a given set of points such as the curvature apex points of curves 402 and 422, therefore describing the minimum energy of the wellbore path. The $T_m$ data represented as curves 404 and 424 is determined based on the conformance of curves 404 and 424 within curve 402. Drilling engineers or automated processes may utilize the resulting $T_m$ data to estimate the necessary casing and casing components for the corresponding borehole segments.

Figure 5:
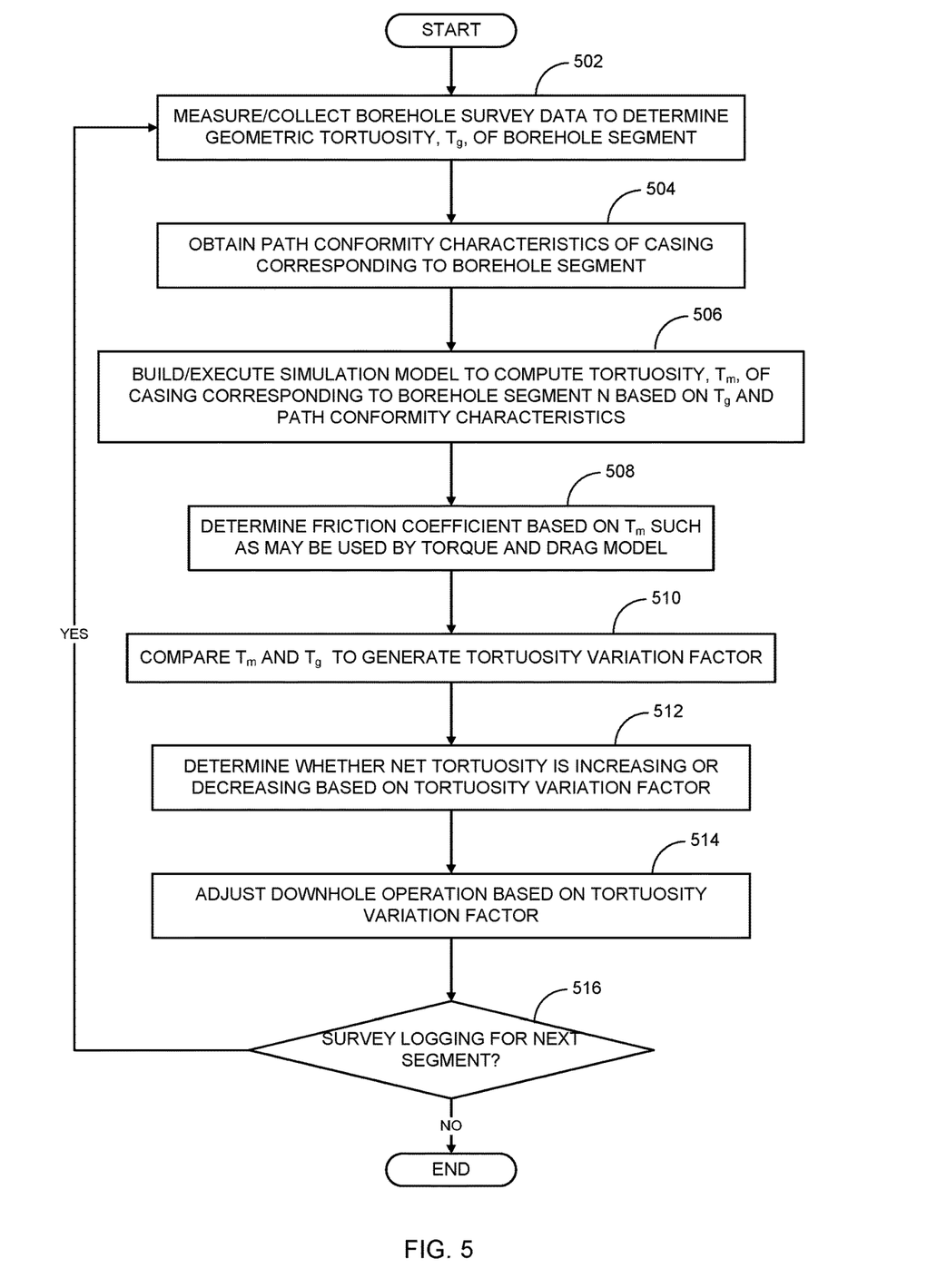
FIG. 5 is a flow diagram depicting operations and functions for determining and utilizing a tortuosity variation factor to optimize downhole operations in accordance with some embodiments.

FIG. 5 is a flow diagram depicting operations and functions for determining and utilizing a tortuosity variation factor to optimize downhole operations in accordance with some embodiments. The operations and functions depicted and described with reference to FIG. 5 may be implemented by one or more of the systems, devices, and components depicted and described with reference to FIGS. 1-4. The process begins as shown at block 502 with systems and components of a drilling system measuring and collecting downhole survey data to determine geometric tortuosity of a given uncased borehole segment. For instance, a survey instrument such as a gyroscopic and/or magnetic sensor may be deployed in a wireline measurement tool or in a drill string BHA to measure signals indicative of dimensionally specified angles such as inclination and azimuth angles and distance between survey points within the borehole segment. At block 504, system components generate or otherwise obtain path conformity characteristics of prospective casing components such as casing tubulars and tubular connectors that correspond to the borehole segment. The path conformity characteristics may include flexure properties of casing tubulars such as bending stiffness, torsion stiffness, elastic deformation properties, plastic deformation properties, and tubular weight.

Using one or more of the path conformity characteristics and the determined geometric tortuosity, the system builds and executes a simulation model to compute the mechanical tortuosity of the modeled casing corresponding to the borehole segment (block 506). For example, a stiff-string model may be utilized to simulate the relative geometric aspects of the casing and borehole to determine a relative positioning of the casing within the borehole segment. A tortuosity of the casing may include calculating a position of a casing tubular within the borehole segment using a stiff-string model that models the casing within the borehole segment including modeling flexure of the casing based on a contour of the borehole segment and a flexure property of the casing. The modeling may include determining a tortuosity of the borehole segment by applying an inclination angle of the borehole segment that was determined by downhole survey sensors. The path conformity characteristic may include at least one of a bending stiffness of the casing tubular and a torsion stiffness of the casing tubular, and the stiff-string model may apply at least one of the bending stiffness of the casing tubular and the torsion stiffness (e.g., as coefficients in stiff-string modeling equations) of the casing tubular to determine the relative positioning of the casing within the borehole. The path conformity characteristic may include at least one of an elastic deformation property of the casing tubular and a plastic deformation property of the casing tubular, and the stiff-string model may apply at least one of the elastic deformation property of the casing tubular and the plastic deformation property of the casing tubular to determine the relative positioning of the casing within the borehole. In some embodiments, the stiff-string model may apply a curvature and torsion of the borehole determined using the downhole survey data to determine the relative positioning of the casing within the borehole.

In addition or alternatively, an energy translation and balancing model may be used to process the geometric tortuosity and casing properties information to calculate the mechanical tortuosity value(s). At block 508, a processing system such as one of the nodes within data processing system 140 may determine a friction factor such as for a drill string within the wellpath based on the mechanical tortuosity. For example, the processing system may execute a model that receives and processes the mechanical tortuosity value(s) to determine a friction coefficient that may be used in a torque and drag model to control and adjust drill string operations.

The process continues as shown at block 510 with a processor comparing the mechanical tortuosity value with a geometric tortuosity value to generate a tortuosity variation factor. For example, the processor may generate the tortuosity variation factor by computing the ratio between the mechanical tortuosity and the geometric tortuosity. At block 512, the processor determines whether the net wellpath tortuosity is increasing based on the tortuosity variation factor generated at block 510. For instance, if the tortuosity variation factor comprises a $T_m/T_g$ ratio, the process may determine that the net wellpath tortuosity is increasing if $T_m/T_g$ is greater than one, is remaining constant if $T_m/T_g$ is equal to or substantially equal to one, and is decreasing if $T_m/T_g$ is less than one. In addition or alternatively to determining an increasing or decreasing wellpath tortuosity, the processor may determine whether an increasing wellpath tortuosity exceeds a specified threshold.

At block 514, system components such as drilling control and steering components may adjust one or more downhole operations based and in response to the indication of increasing or decreasing net wellpath tortuosity and or on whether an increasing tortuosity value (e.g., ratio) exceeds a specified threshold. During autonomous operation, for example, drill steering instructions executed by top drive and steering equipment 104 may be adjusted or otherwise selected based on mechanical tortuosity measurements and quantified values for the relative tortuosity between the open borehole and casing as indicated by increasing wellpath tortuosity and/or wellpath tortuosity exceeding a threshold. For instance, the current drilling direction trajectory may be modified by adjusting a borehole trajectory in response to determining an increasing wellpath tortuosity and modifying a drill string steering operation parameter based, at least in part, on the adjusted borehole trajectory.

In some embodiments, the tortuosity data may be used to adjust downhole casing operations such as casing string completion operation. For example, instructions executed by completion string build equipment 101 may be adjusted or otherwise selected based on mechanical tortuosity measurements and quantified values for the relative tortuosity between the open borehole and casing as indicated by increasing wellpath tortuosity and/or wellpath tortuosity exceeding a threshold. As shown at inquiry block 516, the process may return to block 502 if survey operations on additional borehole segment continue.

Example Computer

Figure 6:
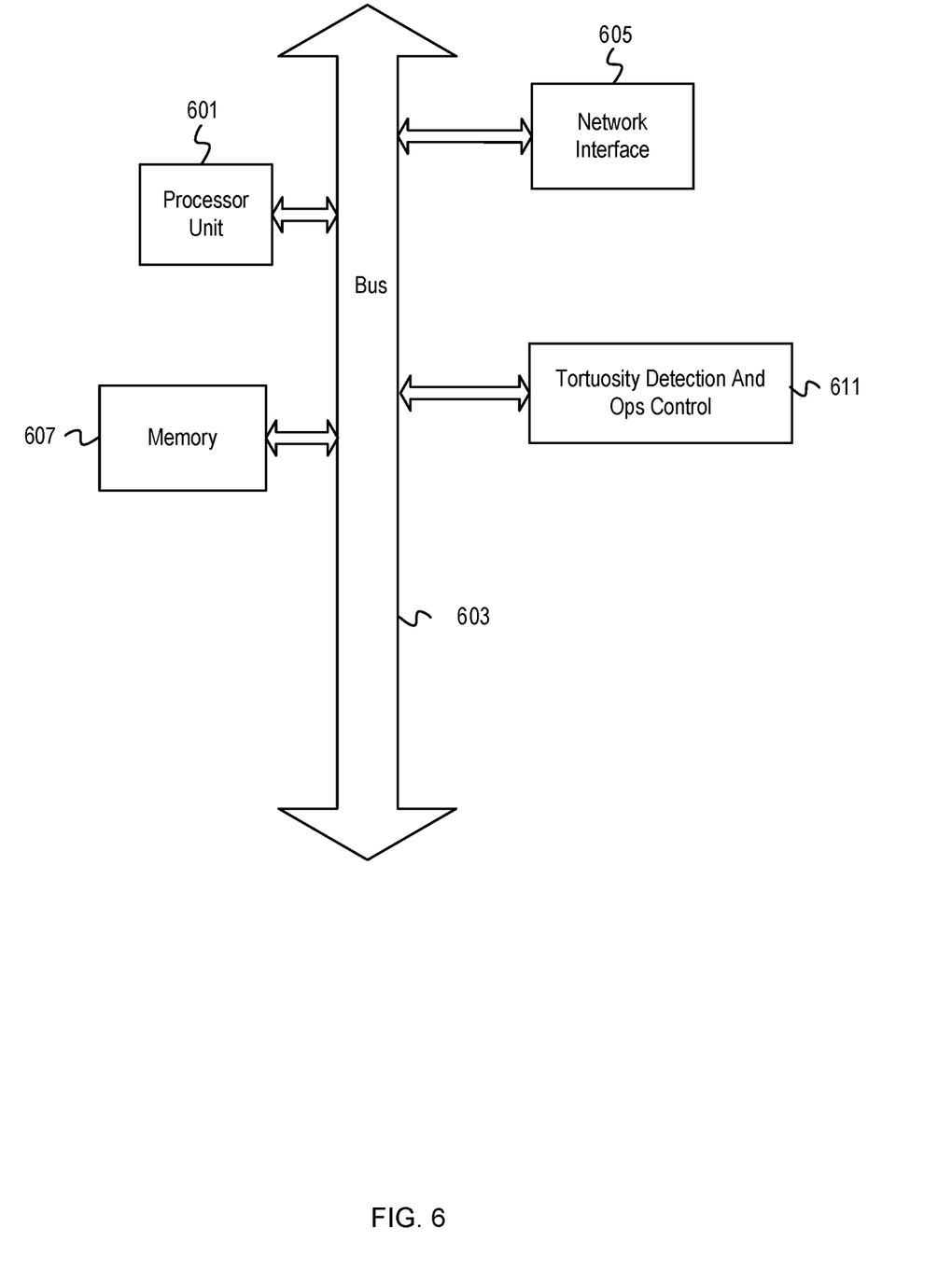
FIG. 6 depicts an exemplary computer system configured to detect tortuosity values and variations in wellpath tortuosity, and to utilize the detected tortuosity data to adjust downhole operations in accordance with some embodiments.

FIG. 6 is a block diagram depicting an example computer system that may be utilized to implement control operations for determining well path tortuosity and using the tortuosity data to optimize downhole operations in accordance with some embodiments. The computer system includes a processor 601 (possibly including multiple processors, multiple cores, multiple nodes, and/or implementing multi-threading, etc.). The computer system includes a memory 607. The memory 607 may be system memory (e.g., one or more of cache, SRAM, DRAM, etc.) or any one or more of the above already described possible realizations of machine-readable media. The computer system also includes a bus 603 (e.g., PCI, ISA, PCI-Express, InfiniBand® bus, NuBus, etc.) and a network interface 605 which may comprise a Fiber Channel, Ethernet interface, SONET, or other interface.

The system also includes a well path tortuosity detection and control system 611, which may comprise hardware, software, firmware, or a combination thereof. Tortuosity detection and control system 611 may be configured similarly to the data processing systems illustrated in FIG. 1, to include the subsystems and components within node 142 and interface unit 132, for example. Tortuosity detection and control system 611 may comprise instructions executable by the processor 601 to implement any of the previously described functionalities that may be partially (or entirely) implemented in hardware and/or on the processor 601. For example, the functionality may be implemented with an application specific integrated circuit, in logic implemented in the processor 601, in a co-processor on a peripheral device or card, etc.

EXAMPLE EMBODIMENTS

Embodiment 1: A method for determining well path tortuosity comprising: determining a tortuosity of a borehole segment; determining a tortuosity of a casing associated with the borehole segment, wherein the tortuosity of the casing is determined based, at least in part, on the tortuosity of the borehole segment and a path conformity characteristic of the casing; and generating a tortuosity variation factor based on a value of the tortuosity of the casing relative to a value of the tortuosity of the borehole segment. The method may further comprise determining a friction factor for a wellpath corresponding to the borehole segment based, at least in part, on the determined tortuosity of the casing. Said generating a tortuosity variation factor may include comparing a value of the tortuosity of the casing and a value of the tortuosity of the borehole segment to generate a tortuosity variation value; determining an increasing or decreasing wellpath tortuosity based, at least in part, on the tortuosity variation value; and adjusting a downhole operation in response to determining an increasing wellpath tortuosity.

Said adjusting the downhole operation in response to determining an increasing wellpath tortuosity may include determining whether the tortuosity variation value exceeds a threshold value; and adjusting the downhole operation in response to determining that the tortuosity variation value exceeds the threshold value. The downhole operation may comprise a drilling steering operation, and said adjusting the downhole operation may comprise adjusting a borehole trajectory in response to determining an increasing wellpath tortuosity; and modifying a drill string steering operation parameter based, at least in part, on the adjusted borehole trajectory. The downhole operation may comprise a casing installation operation, and said adjusting the downhole operation may comprise adjusting installation of casing tubulars within the borehole segment in response to determining an increasing wellpath tortuosity. Said comparing the value of the tortuosity of the casing and the value of the tortuosity of the borehole segment may include determining a ratio between the tortuosity of the casing and the tortuosity of the borehole segment; and determining an increasing or decreasing wellpath tortuosity based, at least in part, on the determined ratio. Said determining a tortuosity of the casing may include calculating a position of a casing tubular within the borehole segment using a stiff-string model that models the casing within the borehole segment including modeling flexure of the casing based on a contour of the borehole segment and a flexure property of the casing. Said determining a tortuosity of the borehole segment may include determining an inclination angle within the borehole segment, and wherein the stiff-string model applies the determined inclination angle. The path conformity characteristic may include at least one of a bending stiffness of the casing tubular and a torsion stiffness of the casing tubular, and the stiff-string model may apply at least one of the bending stiffness of the casing tubular and the torsion stiffness of the casing tubular. The path conformity characteristic may include at least one of an elastic deformation property of the casing tubular and a plastic deformation property of the casing tubular, and the stiff-string model may apply at least one of the elastic deformation property of the casing tubular and the plastic deformation property of the casing tubular. Said determining a tortuosity of the borehole segment may include determining a curvature and a torsion of the borehole segment, and the stiff-string model may apply the determined curvature and torsion.

Embodiment 2: An apparatus comprising: a processor; and a machine-readable medium having program code executable by the processor to cause the apparatus to, determine a tortuosity of a borehole segment; determine a tortuosity of a casing associated with the borehole segment, wherein the tortuosity of the casing is determined based, at least in part, on the tortuosity of the borehole segment and a path conformity characteristic of the casing; and generate a tortuosity variation factor based on a value of the tortuosity of the casing relative to a value of the tortuosity of the borehole segment. The program code may include program code to determine a friction factor for a wellpath corresponding to the borehole segment based, at least in part, on the determined tortuosity of the casing. Said generating a tortuosity variation factor may include comparing a value of the tortuosity of the casing and a value of the tortuosity of the borehole segment to generate a tortuosity variation value; determining an increasing or decreasing wellpath tortuosity based, at least in part, on the tortuosity variation value; and adjusting a downhole operation in response to determining an increasing wellpath tortuosity. Said adjusting the downhole operation in response to determining an increasing wellpath tortuosity may include: determining whether the tortuosity variation value exceeds a threshold value; and adjusting the downhole operation in response to determining that the tortuosity variation value exceeds the threshold value. The downhole operation may comprise a drilling steering operation, and said adjusting the downhole operation may comprise: adjusting a borehole trajectory in response to determining an increasing wellpath tortuosity; and modifying a drill string steering operation parameter based, at least in part, on the adjusted borehole trajectory. The downhole operation may comprise a casing installation operation, and said adjusting the downhole operation may comprise adjusting installation of casing tubulars within the borehole segment in response to determining an increasing wellpath tortuosity. Said comparing the value of the tortuosity of the casing and the value of the tortuosity of the borehole segment may include: determining a ratio between the tortuosity of the casing and the tortuosity of the borehole segment; and determining an increasing or decreasing wellpath tortuosity based, at least in part, on the determined ratio. Said determining a tortuosity of the casing may include calculating a position of a casing tubular within the borehole segment using a stiff-string model that models the casing within the borehole segment including modeling flexure of the casing based on a contour of the borehole segment and a flexure property of the casing. Said determining a tortuosity of the borehole segment may include determining an inclination angle within the borehole segment, and the stiff-string model may apply the determined inclination angle. The path conformity characteristic may include at least one of a bending stiffness of the casing tubular and a torsion stiffness of the casing tubular, and the stiff-string model may apply at least one of the bending stiffness of the casing tubular and the torsion stiffness of the casing tubular. The path conformity characteristic may include at least one of an elastic deformation property of the casing tubular and a plastic deformation property of the casing tubular, and the stiff-string model may apply at least one of the elastic deformation property of the casing tubular and the plastic deformation property of the casing tubular. Said determining a tortuosity of the borehole segment may include determining a curvature and a torsion of the borehole segment, and the stiff-string model may apply the determined curvature and torsion.

What is claimed is:

1. A method for determining well path tortuosity comprising:
   determining a tortuosity of a borehole segment;
   determining a tortuosity of a casing associated with the borehole segment, wherein the tortuosity of the casing is determined based, at least in part, on the tortuosity of the borehole segment and a path conformity characteristic of the casing; and
   generating a tortuosity variation factor based on a value of the tortuosity of the casing relative to a value of the tortuosity of the borehole segment.

2. The method of claim 1, further comprising determining a friction factor for a wellpath corresponding to the borehole segment based, at least in part, on the determined tortuosity of the casing.

3. The method of claim 1, wherein said determining a tortuosity of the casing includes calculating a position of a casing tubular within the borehole segment using a stiff-string model that models the casing within the borehole segment including modeling flexure of the casing based on a contour of the borehole segment and a flexure property of the casing.

4. The method of claim 3, wherein said determining a tortuosity of the borehole segment includes determining an inclination angle within the borehole segment, and wherein the stiff-string model applies the determined inclination angle.

5. The method of claim 3, wherein the path conformity characteristic includes at least one of a bending stiffness of the casing tubular and a torsion stiffness of the casing tubular, and wherein the stiff-string model applies at least one of the bending stiffness of the casing tubular and the torsion stiffness of the casing tubular.

6. The method of claim 3, wherein the path conformity characteristic includes at least one of an elastic deformation property of the casing tubular and a plastic deformation property of the casing tubular, and wherein the stiff-string model applies at least one of the elastic deformation property of the casing tubular and the plastic deformation property of the casing tubular.

7. The method of claim 3, wherein said determining a tortuosity of the borehole segment includes determining a curvature and a torsion of the borehole segment, and wherein the stiff-string model applies the determined curvature and torsion.

8. The method of claim 1, wherein said generating a tortuosity variation factor includes:
comparing a value of the tortuosity of the casing and a value of the tortuosity of the borehole segment to generate a tortuosity variation value;
determining an increasing or decreasing wellpath tortuosity based, at least in part, on the tortuosity variation value; and
adjusting a downhole operation in response to determining an increasing wellpath tortuosity.

9. The method of claim 8, wherein said adjusting the downhole operation in response to determining an increasing wellpath tortuosity includes:
determining whether the tortuosity variation value exceeds a threshold value; and
adjusting the downhole operation in response to determining that the tortuosity variation value exceeds the threshold value.

10. The method of claim 9, wherein the downhole operation comprises a drilling steering operation, said adjusting the downhole operation comprising:
adjusting a borehole trajectory in response to determining an increasing wellpath tortuosity; and
modifying a drill string steering operation parameter based, at least in part, on the adjusted borehole trajectory.

11. The method of claim 9, wherein the downhole operation comprises a casing installation operation, said adjusting the downhole operation comprising adjusting installation of casing tubulars within the borehole segment in response to determining an increasing wellpath tortuosity.

12. The method of claim 9, wherein said comparing the value of the tortuosity of the casing and the value of the tortuosity of the borehole segment includes:
determining a ratio between the tortuosity of the casing and the tortuosity of the borehole segment; and
determining an increasing or decreasing wellpath tortuosity based, at least in part, on the determined ratio.

13. An apparatus comprising:
a processor; and
a machine-readable medium having program code executable by the processor to cause the apparatus to,
determine a tortuosity of a borehole segment;
determine a tortuosity of a casing associated with the borehole segment, wherein the tortuosity of the casing is determined based, at least in part, on the tortuosity of the borehole segment and a path conformity characteristic of the casing; and
generate a tortuosity variation factor based on a value of the tortuosity of the casing relative to a value of the tortuosity of the borehole segment.

14. The apparatus of claim 13, wherein the program code includes program code to determine a friction factor for a wellpath corresponding to the borehole segment based, at least in part, on the determined tortuosity of the casing.

15. The apparatus of claim 13, wherein said determining a tortuosity of the casing includes calculating a position of a casing tubular within the borehole segment using a stiff-string model that models the casing within the borehole segment including modeling flexure of the casing based on a contour of the borehole segment and a flexure property of the casing.

16. The apparatus of claim 15, wherein said determining a tortuosity of the borehole segment includes determining an inclination angle within the borehole segment, and wherein the stiff-string model applies the determined inclination angle.

17. The apparatus of claim 15, wherein the path conformity characteristic includes at least one of a bending stiffness of the casing tubular and a torsion stiffness of the casing tubular, and wherein the stiff-string model applies at least one of the bending stiffness of the casing tubular and the torsion stiffness of the casing tubular.

18. The apparatus of claim 15, wherein the path conformity characteristic includes at least one of an elastic deformation property of the casing tubular and a plastic deformation property of the casing tubular, and wherein the stiff-string model applies at least one of the elastic deformation property of the casing tubular and the plastic deformation property of the casing tubular.

19. The apparatus of claim 15, wherein said determining a tortuosity of the borehole segment includes determining a curvature and a torsion of the borehole segment, and wherein the stiff-string model applies the determined curvature and torsion.

20. The apparatus of claim 13, wherein said generating a tortuosity variation factor includes:
comparing a value of the tortuosity of the casing and a value of the tortuosity of the borehole segment to generate a tortuosity variation value;
determining an increasing or decreasing wellpath tortuosity based, at least in part, on the tortuosity variation value; and
adjusting a downhole operation in response to determining an increasing wellpath tortuosity.

21. The apparatus of claim 20, wherein said adjusting the downhole operation in response to determining an increasing wellpath tortuosity includes:
determining whether the tortuosity variation value exceeds a threshold value; and
adjusting the downhole operation in response to determining that the tortuosity variation value exceeds the threshold value.

22. The apparatus of claim 21, wherein the downhole operation comprises a drilling steering operation, said adjusting the downhole operation comprising:
adjusting a borehole trajectory in response to determining an increasing wellpath tortuosity; and modifying a drill string steering operation parameter based, at least in part, on the adjusted borehole trajectory.

23. The apparatus of claim 21, wherein the downhole operation comprises a casing installation operation, said adjusting the downhole operation comprising adjusting installation of casing tubulars within the borehole segment in response to determining an increasing wellpath tortuosity.

24. The apparatus of claim 21, wherein said comparing the value of the tortuosity of the casing and the value of the tortuosity of the borehole segment includes:
   determining a ratio between the tortuosity of the casing and the tortuosity of the borehole segment; and
   determining an increasing or decreasing wellpath tortuosity based, at least in part, on the determined ratio.

* * * * *